United States Patent [19]
Hollmann

[11] 3,826,135
[45] July 30, 1974

[54] SWINGING RAIN GAUGE
[76] Inventor: Elmer Hollmann, 618 E. Ashton, Grand Island, Nebr. 68801
[22] Filed: Mar. 30, 1973
[21] Appl. No.: 346,599

[52] U.S. Cl. .................................. 73/171, 73/189
[51] Int. Cl. ....................... G01w 1/14, G01w 1/02
[58] Field of Search ....................................... 73/171

[56] References Cited
UNITED STATES PATENTS

| | | | |
|---|---|---|---|
| 1,118,259 | 11/1914 | Beard | 73/171 |
| 2,384,954 | 9/1945 | Moore | 73/171 |
| 2,520,557 | 8/1950 | Moore | 73/171 |
| 2,935,872 | 5/1960 | Misner | 73/171 |

FOREIGN PATENTS OR APPLICATIONS

| 292,776 | 6/1928 | Great Britain | 73/171 |
|---|---|---|---|

Primary Examiner—James J. Gill
Assistant Examiner—Anthony V. Ciarlante
Attorney, Agent, or Firm—Shoemaker and Mattare

[57] ABSTRACT

A rain gauge which accurately measures rainfall regardless of the presence of wind, comprising a vertical support rod, a wind operated directional fin, said fin rotatably mounted on said rod for rotational movement responsive to the direction of wind, a wind operated rain gauge support pivotally connected to said fin about a horizontal axis adjacent said rod and movable with said fin and pivotally movable about said horizontal axis responsive to the velocity of wind, and rain collecting receptacle means carried by the support and movable therewith for accurately collecting and measuring rainfall regardless of the presence or direction or velocity of wind.

6 Claims, 6 Drawing Figures

PATENTED JUL 30 1974　3,826,135
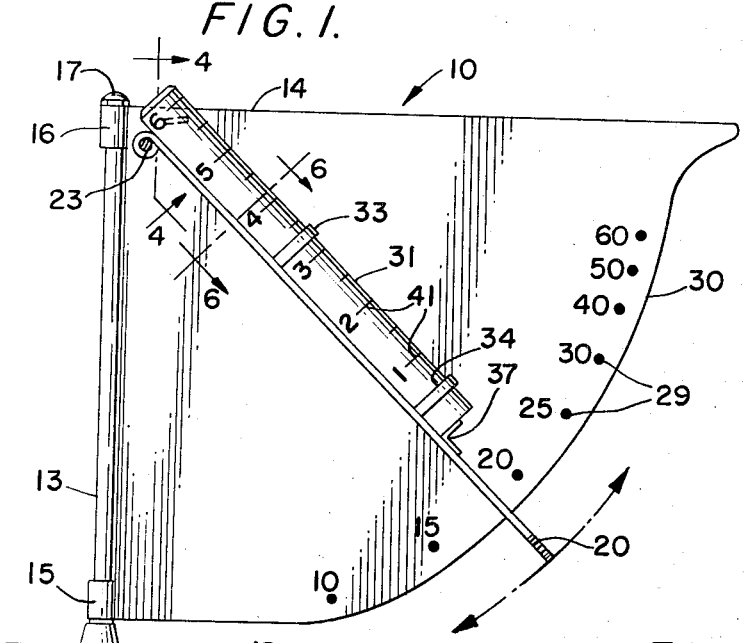
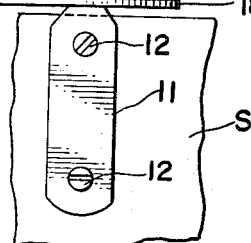
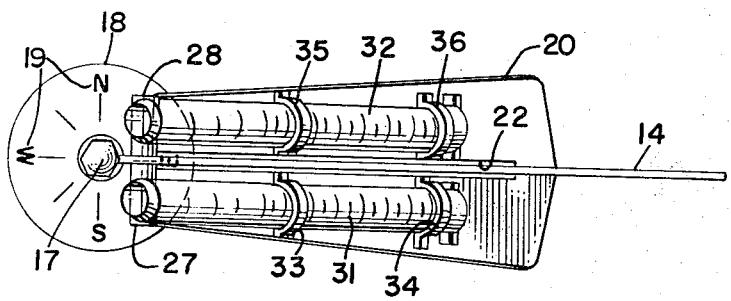
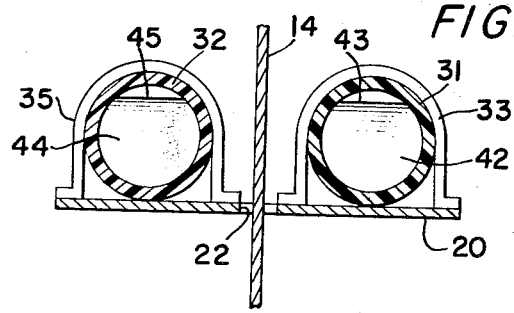
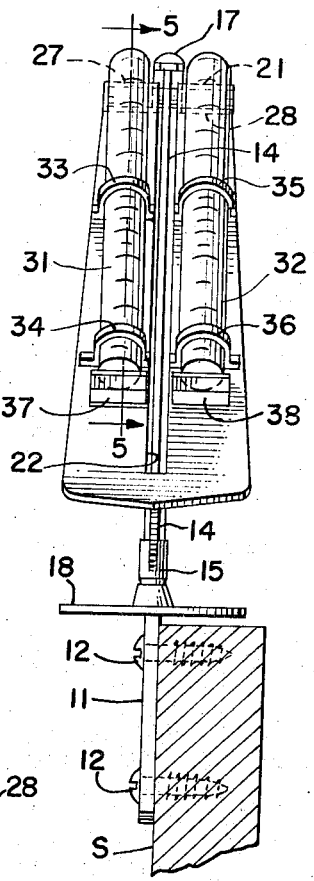
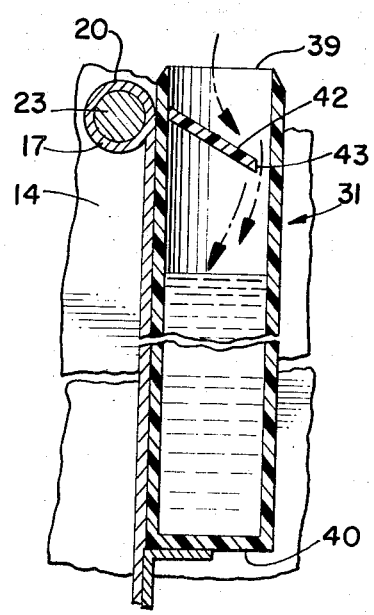

SWINGING RAIN GAUGE

BACKGROUND OF THE INVENTION

This invention relates to rain gauges and in particular, to a swinging rain gauge which is mounted to means movable in response to the velocity and direction of wind so that the rain gauge is enabled to collect and accurately measure rainfall regardless of the presence or the velocity or the direction of wind.

Prior art rain gauges do not have means to render them accurate in the presence of wind; and accordingly, if a wind is blowing while it is raining, the rain gauge is not capable of accurately measuring the rainfall since the rainfall will be moving in a direction at an angle to the opening to the rain gauge and not all of the drops will enter the rain gauge.

With the present invention, the rain gauge is mounted to a means which is responsive to both the velocity and direction of wind such that the rain gauge is maintained in a position with its axis parallel to the direction of the rainfall; and, accordingly, the rain gauge collects and accurately measures the rainfall regardless of the presence of wind, since the axis of of the rain gauge is always maintained parallel to the direction in which the rain is falling.

In particular, the present invention concerns a combination rain gauge and wind velocity and direction indicator so that not only can the amount of rainfall be measured, but the direction and velocity of wind is indicated.

OBJECTS OF THE INVENTION

It is an object of this invention to provide a rain gauge which accurately collects and measures rainfall regardless of the presence of wind or of the direction or velocity of wind.

Another object of the invention is to provide a rain gauge in combination with a wind velocity and direction indicating means.

BRIEF DESCRIPTION OF THE DRAWINGS

FIG. 1 is a view in elevation of a rain gauge and wind responsive means in accordance with the invention showing the rain gauge and wind velocity means positioned to indicate a wind velocity of approximately 18 miles per hour.

FIG. 2 is an end view of the device of FIG. 1.

FIG. 3 is a top plan view of the device of FIG. 1.

FIG. 4 is an enlarged view in section taken along line 4—4 in FIG. 1.

FIG. 5 is an enlarged view in section with portions broken away taken along line 5—5 in FIG. 2.

FIG. 6 is an enlarged view in section taken along line 6—6 in FIG. 1.

DETAILED DESCRIPTION OF THE INVENTION

In the drawings, wherein like reference numerals indicate like parts throughout the several views, a rain gauge in accordance with the invention is indicated generally at 10 in FIG. 1.

The rain gauge 10 comprises a base or attaching bracket 11 secured to a supporting surface S by means of a plurality of fasteners 12 extended through the bracket into the supporting surface. An elongate pivot shaft or rod 13 is connected to and extends vertically upwardly from the bracket 11, and a wind direction indicating fin 14 is pivotally attached to the shaft 13 by means of a pair of bushings 15 and 16 either secured to or integral with the fin 14 and rotatably positioned on the shaft 13. A cap nut 17 is positioned on the upper end of the shaft 13 to maintain the fin in position thereon as seen in FIG. 1.

A horizontal disc 18 having suitable indicia 19 thereon is secured to the bracket 11 at the lower end of the shaft 13 and cooperates with the fin 14 to indicate the direction of wind.

A bifurcated or slotted wind velocity indicating vane or rain gauge support 20 is pivotally mounted to the fin 14 at the bifurcated end 21 thereof with the fin 14 received in the slot 22 in the vane 20. The bifurcated end 21 of the vane is secured to fin 14 by means of a threaded bolt 23 extended through an opening 24 in the fin adjacent the upper inner edge thereof, and a threaded cap bolt 25 engaged with the bolt 23 on opposite sides of the fin 14 and maintained securely together in threaded relationship by means of a lock washer 26. The bolt 23 and cap bolt 25 engage opposite sides of the fin 14, and the vane 20 includes a pair of bushings 27 and 28 either attached thereto or integral therewith at the bifurcated end 21 thereof which are pivotally received over the bolt 23 and cap bolt 25 to enable the vane to pivot relative thereto.

Suitable indicia 29 is on the fin 14 adjacent an outer arcuate edge 30 thereof, and the vane 20 cooperates with the indicia 29 to indicate the velocity of wind.

A pair of graduated, elongate transparent receptacles or tubes 31 and 32 are mounted on the vane 20 on opposite sides of the fin 14 by means of a pair of spaced clamps 33 and 34 and 35 and 36 suitably secured to the vane 20 as by adhesive, welding, rivets or the like and positioned adjacent the upper end and lower end, respectively, of the tubes 31 and 32. The lower end of the tubes 31 and 32 rest against and are supported on L-shaped angle brackets 37 and 38, respectively, suitably affixed to the vane 20, and the upper ends of the tubes extend to above the upper edge of fin 14 and 20 so as to accurately collect rainfall free of interference with the fin or vane.

As seen in FIGS. 5 and 6, the tubes are identically constructed and only one tube, 31, will be described in detail.

As seen, the tubes have an inwardly beveled open upper end 39 defining a sharp knife-like edge against which raindrops engage and are split to prevent splashing of raindrops into the tubes which would occur if the open end of the tube had a flat annular surface thereon. The opposite or lower end of the tube is closed at 40, and suitable indicia 41 is provided on the outer surface of the tube for indicating the amount of rainfall. For example, the indicia 41 may be marked in inches, if desired.

A baffle 42 is secured within the tube 31 adjacent the upper end thereof, and the baffle slopes downwardly as seen in FIG. 5 to enable rainfall to readily enter the tube but to prevent rainfall in the tube from splashing out of the tube as the tube moves in response to wind.

An opening 43 is provided past one edge of the baffle 42 for movement of rainfall therepast. An identical baffle 44 and opening 45 are in the other tube 32.

By way of specific example, in a rain gauge constructed in accordance with the present invention, the fin 14, shaft 13, vane 20 and supporting structures and fasteners would all be constructed of aluminum, and the tubes 31 and 32 would be made of a suitable transparent plastic material. The fin 14 would be approximately 9 inches long and 7 inches high, and the vane would be approximately 2½ inches wide. Both the vane and fin would have a thickness of approximately one-quarter inch, and the bushings 27 and 28 at the bifurcated end of the vane would each have a length of approximately three-fourths of an inch. The tubes 31 and 32 would be approximately 6 inches long and five-eighths of an inch wide.

In connection with the above, it is pointed 0ut that the size or area of the vane 20 upon which wind acts to move the vane to indicate wind velocity, and the weight of the vane and receptacles 31 and 32, in relation to the weight of rain water collected in the receptacles, is such that any error which results in the indication of wind velocity is insignificant. The weight of rain water collected in the receptacles will be on the order of a fraction of an ounce under most conditions, and thus will have practically no effect on the action of the vane under the influence of the wind. Moreover, the rainwater may be emptied when it reaches a level of about 2 inches, if it ever accumulates to such a level, and thus the weight thereof kept to an insignificant value. Further, when low wind velocities are encountered, the vane and receptacles are hanging nearly vertical, and the influence of the weight of any water in the receptacles is accordingly negligible, and when high or large wind velocities are encountered, the force thereof is obviously commensurately greater, so that the effect or influence of any rain water in the receptacles is negligible.

As this invention may be embodied in several forms without departing from the spirit or essential characteristics thereof, the present embodiment is therefore illustrative and not restrictive, since the scope of the invention is defined by the appended claims rather than by the description preceiding them, and all changes that fall within the metes and bounds of the claims or that form their functional as well as conjointly cooperative equivalents, are therefore intended to be embraced by those claims.

What is claimed is:

1. In combination, a rain gauge and wind direction and velocity indicator, comprising a substantially vertical supporting rod, fastening means securing said supporting rod to a supporting structure, a substantially flat, planar, vertically disposed, wind operated directional fin rotatably supported at one vertical edge thereof to said rod and having an arcuate, convex edge opposite said one vertical edge, means supported on said rod adjacent said fin and having indicia thereon for cooperation with said fin to indicate wind direction as said fin is caused to rotate about said rod responsive to wind direction, a substantially flat, planar, wind operated wind velocity vane having a longitudinally extending slot therein with said fin disposed through said slot and substantially identical portions of said vane disposed on opposite sides of said fin, pivot means connecting an upper edge portion of the vane with an upper portion of said fin adjacent the vertical edge thereof for pivotal movement of said vane about an axis perpendicular to the plane of the fin so that a lower edge portion of the vane moves along the arcuate edge of the fin responsive to wind velocity, suitable indicia on the fin at the arcuate edge thereof to indicate the wind velocity, an elongate, tubular, rain collecting receptacle supported on each of said vane portions on opposite sides, respectively, of said fin, said receptacles thus maintained at all times with their axes parallel to the direction of rainfall, each of said receptacles having an open upper end and a closed lower end and having indicia thereon to indicate the amount of rainfall collected therein, the upper ends of the receptacles projecting above the upper edges of the fin and vane and having a knife edge configuration to define a precise, known area through which rain will fall, and baffle means in each receptacle to prevent splashing of collected rainfall from the receptacles.

2. A rain gauge as in claim 1, wherein the plane of said vane is perpendicular to the plane of said fin, and the axes of the receptacles are parallel to each other and to the planes of the fin and vane.

3. A rain gauge as in claim 1, wherein said fin is mounted for 360° rotation around said rod.

4. A rain gauge as in claim 1, wherein the receptacles comprise a synthetic plastic material.

5. A rain gauge as in claim 1, wherein the receptacles each have suitable indicia on an outer surface thereof to indicate the number of inches of rainfall.

6. A rain gauge as in claim 5, wherein a pair of clamps are secured to said vane adjacent opposite ends of each receptacle, said clamps engaging and holding said receptacles to said vane.

* * * * *